United States Patent
Kikuchi et al.

(10) Patent No.: US 12,526,067 B2
(45) Date of Patent: Jan. 13, 2026

(54) WAVELENGTH MULTIPLEXING OPTICAL TRANSMISSION SYSTEM AND WAVELENGTH MULTIPLEXING OPTICAL TRANSMITTER

(71) Applicant: Lumentum Japan, Inc., Sagamihara (JP)

(72) Inventors: Nobuhiko Kikuchi, Tokyo (JP); Shigehisa Tanaka, Tokyo (JP)

(73) Assignee: LumentumRadiant GmbH, Baar (CH)

( * ) Notice: Subject to any disclaimer, the term of this patent is extended or adjusted under 35 U.S.C. 154(b) by 302 days.

(21) Appl. No.: 18/315,348

(22) Filed: May 10, 2023

(65) Prior Publication Data

US 2024/0113797 A1    Apr. 4, 2024

(30) Foreign Application Priority Data

Sep. 29, 2022  (JP) .................................. 2022-156026
Dec. 23, 2022  (JP) .................................. 2022-207203

(51) Int. Cl.
*H04J 14/02*    (2006.01)
*H04B 10/61*    (2013.01)

(52) U.S. Cl.
CPC ........ *H04J 14/0201* (2013.01); *H04B 10/614* (2013.01); *H04J 14/02762* (2023.08)

(58) Field of Classification Search
CPC .......................... H04J 14/02–0307; H04J 14/06
See application file for complete search history.

(56) References Cited

U.S. PATENT DOCUMENTS

| | | | | |
|---|---|---|---|---|
| 5,841,557 | A | * | 11/1998 | Otsuka ................. H04J 14/0307 398/79 |
| 2003/0123795 | A1 | * | 7/2003 | Wang ................. G02B 6/29386 385/24 |
| 2004/0190903 | A1 | * | 9/2004 | Miura ................. H04J 14/0224 398/79 |

(Continued)

FOREIGN PATENT DOCUMENTS

| WO | WO-0203577 A1 | * | 1/2002 | ......... H04B 10/2525 |
|---|---|---|---|---|
| WO | WO-2024036975 A1 | * | 2/2024 | ........... G02B 6/4204 |

OTHER PUBLICATIONS

John Johnson; "FWM Analysis of PAM4 LR/ER PMDs"; IEEE 802.3df; Optical Ad hoc; Apr. 11, 2022.

(Continued)

*Primary Examiner* — Nathan M Cors
(74) *Attorney, Agent, or Firm* — Harrity & Harrity, LLP

(57) ABSTRACT

A plurality of optical signals are arranged on optical frequency grids having a frequency spacing of $\Delta f$, a wavelength multiplexing optical signal includes at least one specific arrangement signal group, and the specific arrangement signal group includes Q S signal(s) and R P signal(s), where Q is an integer of 1 or more and R is an integer of 1 or more. A frequency difference between any pair of S signals included in the specific arrangement signal group is different from frequency differences between all of other pairs of S signals and frequency differences between all pairs of P signals, and a frequency difference between any pair of P signals included in the specific arrangement signal group is different from frequency differences between all pairs of S signals and frequency differences between all of other pairs of P signals.

18 Claims, 10 Drawing Sheets

(56) References Cited

U.S. PATENT DOCUMENTS

2012/0321303 A1* 12/2012 Zhang ................ H04L 27/2075
398/45

OTHER PUBLICATIONS

Kiang Zhou, et al.; "Four-Wave Mixing Penalty for WDM-basedEthernet PMDs in O-band"; IEEE 802.3df; May 24, 2022.
Kiang Liu, et al.; "Effective suppression of inter-channel FWM for 800G-LR4and 1.6T-LR8 based on 200Gb/s PAM4 channels"; IEEE 802.3df; Jul. 14, 2022.

* cited by examiner (IN CASE OF CO-POLARIZATION)   (IN CASE OF ORTHOGONAL POLARIZATION)

WAVELENGTH MULTIPLEXING OPTICAL TRANSMISSION SYSTEM AND WAVELENGTH MULTIPLEXING OPTICAL TRANSMITTER

CROSS-REFERENCE TO RELATED APPLICATIONS

The present application claims priority from Japanese Patent Application number 2022-156026 filed on Sep. 29, 2022, and from Japanese Patent Application number 2022-207203 filed on Dec. 23, 2022, the contents of which are hereby incorporated by reference into this application.

TECHNICAL FIELD

The present disclosure relates generally to a wavelength multiplexing optical transmission system and a wavelength multiplexing optical transmitter, and to optical information transmission using an optical fiber.

BACKGROUND

Along with rapid increase of Internet traffic, there is a growing need for increasing capacity of short and medium distance optical fiber communication (distance of from 100 meters (m) to several tens of kilometers (km)) connecting inside of a data center or between data centers. In such a short and medium distance range, there is widely used an intensity-modulation/direct-detection (IM/DD) system using single-polarization optical signals, which has simple structure and has low cost and power consumption. Standardization bodies, such as Institute of Electrical and Electronics Engineers (IEEE) 802.3 and Optical Internetworking Forum (OIF), have taken the initiative to promote standardization of system specifications, such as types, transmission distances, and wavelength arrangements, of optical fibers and structures, sizes, power consumption, and modulation systems of optical transmitters and receivers (optical transceivers and optical interfaces). For example, a transmission capacity per optical transceiver has increased from 100 gigabits per second (Gbit/s) to 400 Gbit/s to promote higher speeds, and, at present, increase of the capacity to 800 Gbit/s or more to further increase the speed is considered. Such increase in speed is achieved by means of technologies, such as increase of a transmission speed (50-gigabaud (Gbaud) or 100-Gbaud modulation), multi-leveling (four-level intensity modulation), and wavelength multiplexing (four to eight waves).

The standard for a short distance optical fiber transmission having a transmission distance of from several hundreds of meters to several tens of kilometers assumes usage of, as a transmission medium, mainly a standard single mode fiber (SMF). Further, in order to prevent waveform deterioration due to wavelength dispersion of a high-speed optical signal, a 1.3 micrometer (μm) band (O-band), in which the wavelength dispersion of the standard single mode fiber becomes zero, is used.

Consequently, reception sensitivity is degraded along with increase in speed and multi-leveling (for example, when the signal modulation speed is quadrupled, the reception sensitivity is degraded by 3 decibels (dBs), and when multi-leveling from two levels to four levels is performed, the reception sensitivity is degraded by about 5 dB). In order to compensate for the degradation of the reception sensitivity, it is required to increase a light output intensity of the optical transceiver.

Such increase of the optical signal intensity and a zero dispersion property of the optical fiber cause a large problem of generation of four-wave mixing (FWM) light due to a FWM effect, which is an optical fiber non-linear effect. In some cases, during local area network wavelength division multiplexing (LAN-WDM) (e.g., with a frequency grid of 800 gigahertz (GHz)) transmission in the 1.3 μm band of 2 km or longer, there is a risk of FWM light generation at a time of high optical input power, that the FWM light is generated when the polarizations of the optical signals are aligned, and that the phase matching condition is satisfied to increase the generation efficiency when the zero dispersion of the optical fiber is halfway between the optical signals (optical channels) relating to the FWM generation.

Now, the principle of generation of the FWM light, which is a focus of some implementations described herein, is described with reference to FIG. 1A to FIG. 1D. FIG. 1A is an optical signal arrangement example in wavelength multiplexing (WDM) transmission. On an optical frequency axis, optical frequency grids having constant frequency spacings ($\Delta f$) are defined. In FIG. 1A, four optical signals of sig1 to sig4 are arranged on four successive frequency grids of an optical frequency f1 (wavelength $\lambda 1$) to an optical frequency f4 (wavelength $\lambda 4$). In some implementations described herein, each optical signal is mainly identified based on an optical frequency and a polarization state, but it is clear that the same optical signal can be identified based on the polarization state and a wavelength corresponding to the optical frequency.

The frequency spacing or the wavelength spacing of the grids varies depending on the transmission standard. As typical examples, an 800 GHz spacing (wavelength spacing of about 4.5 nanometers (nm)) is used in LAN-WDM for short distance transmission, and a wavelength spacing of 20 nm (about 3.5 terahertz (THz) spacing) is used in CWDM. The actual frequency (wavelength) of the optical signal is allowed to have an error around the specified grid. For example, a 400 Gigabit Ethernet transmission standard of 400GBASE-FR4 uses CWDM, and wavelength ranges of the four signals are defined as from 1,264.5 nm to 1,277.5 nm, from 1,284.5 nm to 1,297.5 nm, from 1,304.5 nm to 1,317.5 nm, and from 1,324.5 nm to 1,337.5 nm. In this example, an allowable error (full width) is 13 nm (±6.5 nm) with respect to the wavelength spacing of 20 nm.

The left diagram of FIG. 1B is a schematic diagram of a case (partially degenerate case) in which two strong waves of optical signals pump1 and pump2 having different wavelengths (in this example, optical frequencies fp1 and fp2) are input with co-polarization to the optical fiber so that the FWM light is generated due to a non-linear effect of the optical fiber. The optical fiber is a transmission medium having a weak third-order non-linear effect (Kerr effect). When the intensity of the optical signal is strong, FWM light which is a new electric field component proportional to the cube of the optical signal electric field is caused in the optical fiber. In a case of two-wavelength transmission with a frequency spacing of $\Delta fp$, there is a possibility of FWM light generation at two locations, specifically, at a frequency of (fp1−fp2)+fp1=fp1−$\Delta fp$ (fwm2 light of FIG. 1B) and a frequency of (fp2−fp1)+fp2=fp2+$\Delta fp$ (fwm1 light of FIG. 1B). When the two optical signals are arranged on adjacent frequency grids, FWM light beams are arranged on frequency grids on both sides. When an optical signal is arranged on the same frequency grid as that of the generated FWM light, the FWM light interferes with the optical signal on the grid so that the transmission quality is greatly degraded.

The optical fiber has a wavelength dispersion characteristic, that is, a light propagation velocity that greatly varies depending on a wavelength (frequency) of the optical signal, and hence, in a large number of cases, the FWM light disappears before it grows strongly due to the difference between the FWM light and the signal light. However, when the wavelength dispersion of the optical fiber is close to zero, in some cases, during optical fiber propagation, a phase matching condition in which a phase of FWM light generated in each part of the optical fiber in a longitudinal direction thereof is matched is satisfied so that the FWM light strongly grows. Further various statistical factors are related to the generation and the growth of the FWM light, and hence signal deterioration does not always occur. For example, when a zero-dispersion wavelength of the optical fiber of the transmission line is present so as to be biased toward any of right and left sides of the optical frequencies of pump1 and pump2 of FIG. 1B, only one of fwm1 or fwm2 may strongly grow, and when fluctuations of the zero-dispersion wavelength are large and the phase matching bandwidth of the optical fiber is narrow, none of the FWM light beams may strongly grow. Further, when the optical signal on the frequency grid has a frequency deviation, the frequency of the generated FWM light may be deviated so that the FWM light does not overlap another optical signal, and thus no quality degradation may be caused.

In contrast, the right diagram of FIG. 1B shows a case in which two waves of optical signals are input so that polarizations thereof are orthogonal to each other. No FWM light is generated in such a case in which pump light beams are orthogonal to each other. In the following, in some implementations described herein, when two orthogonal waves are to be indicated, one of the waves is referred to as "S-polarized wave" and is indicated by an upward arrow, and the other wave is referred to as "P-polarized wave" and is indicated by a downward arrow. That is, notes of S and P merely represent two orthogonal waves, and hence the note of S does not always indicate the S-polarized wave, and may indicate the P-polarized wave. Further, the note of P does not always indicate the P-polarized wave, and may indicate the S-polarized wave. The same holds true also for the FWM light.

FIG. 1C shows the most general non-degenerate case in which the FWM light is generated from three optical signals having different wavelengths. In this example, the three optical signals are referred to as, in order of increasing frequency, "pump light 1" (pump1: frequency fp1), "pump light 2" (pump2: frequency fp2), and "idler light" (idler: frequency fi). The generation process of FWM light can be described with the following two stages.

(1) Generation of frequency beating: the pump light 1 and the pump light 2, which have the same polarization and proximate frequencies, cause a difference frequency beating (in this example, Δfp) of the pump light beams in the optical fiber. In general, the intensity of the frequency beating is determined based on the co-polarization component of the pump light 1 and the pump light 2, and when the polarizations of both of the pump light beams are orthogonal to each other, no frequency beating is generated. (2) The idler light corresponding to the third optical signal is subjected to phase modulation due to the frequency beating so that FWM light (fwm1) is generated at a place separated away by fp2−fp1=+Δfp. Further, FWM light (fwm2) is also caused at a place separated away by −Δfp. This process is generally independent of the polarization state of the idler light, and the polarization state of the generated FWM light becomes the same as that of the idler light. Further, the frequencies of the generated FWM light become f(fp2,fp1,fi)=fi+(fp2−fp1) and fi−(fp2−fp1). In this expression, the three arguments of the function "f" correspond to, in order from the front, optical frequencies of the pump light 2, the pump light 1, and the idler light.

For the generation of the FWM light in the optical fiber, as an important condition, it is required to satisfy a phase matching condition in which the zero-dispersion wavelength of the optical fiber is matched between the wavelengths of the pump light and the idler light relating to the generation, and the phase of the FWM light gradually growing during transmission in the optical fiber having a length of several kilometers is kept constant. The zero-dispersion wavelength of the optical fiber is not constant and is statistically distributed in a certain wavelength range, and is also not constant in a longitudinal direction of the optical fiber. Accordingly, the degree of satisfaction of the phase matching condition, that is, the generation efficiency of the FWM light has large variations depending on each optical fiber. A phase matching bandwidth of the optical fiber is a wavelength range in which the phase matching is satisfied, and it is known that the phase matching bandwidth becomes larger as fluctuations of the zero-dispersion wavelength in the longitudinal direction of the optical fiber become smaller, and the phase matching bandwidth becomes smaller as the fluctuations become larger. Those fluctuations are affected also depending on the structure of the optical fiber, the manufacturing method, the manufacturing error, the splice distance, and the like, and hence those fluctuations take values that greatly vary also depending on the type and the manufacturer of the optical fiber. In an evaluation example of the phase matching bandwidth in a 1.3 km-band standard dispersion fiber (SMF), which is widely used in short distance transmission, measured values of the phase matching bandwidth have large variations. For example, a measured value is 2 nm or less in the optical fiber having low generation efficiency of FWM light, while the measured value becomes as wide as 16 nm in the optical fiber in the worst case in which the FWM generation efficiency is high. Further, when the spacing of the optical signals exceeds this bandwidth, the generation efficiency of the FWM light is sharply reduced.

There is no standardization rule for the output polarization state of the short distance optical transmitter. However, in an integrated and downsized optical transmission module, polarized waves are output in an aligned state in a large number of cases, and the generation efficiency of the FWM light becomes maximum in those cases. Meanwhile, in a case in which the optical fiber length is long, there is known a phenomenon in which the orthogonality of optical signals is lost little by little due to polarization mode dispersion (PMD) which is the slight birefringence that the optical fiber has.

FIG. 1D shows generation of FWM light in three-wavelength multiplexing transmission in which three waves of optical signals sig1, sig2, and sig3 are arranged on adjacent frequency grids f1, f2, and f3, respectively. The above-mentioned partially degenerate FWM light is a special example in which one of the pump light beams and the idler light serve as the same optical signal. The FWM light serving as noise light is generated such that, for every two waves of optical signals, two FWM light beams generated at points on both sides of the two waves at equal spacings. Accordingly, in the case of three wavelengths, as illustrated in FIG. 1D, the number of FWM light beams is 3×2=6 corresponding to frequencies f−1, f0, f1, f3, f4, f5. Among those FWM light beams, the FWM light beams generated at f1 and f3 are liable to overlap the optical signals sig1 and sig3, which may cause transmission deterioration. Meanwhile, the non-degenerate FWM light is generated by a combination in which the optical signals sig1, sig2, and sig3 are assigned to the pump light 1, the pump light 2, and the idler light. The total number of FWM light beams is 3×2×1=6, and, as the generated position, two FWM light beams are generated at each of the frequencies f0, f2, and f4. Among those FWM light beams, the FWM light generated at the frequency f2 causes the deterioration of the optical signal sig2. When those FWM light beams are added, the total number of generated FWM light beams is twelve. It is known that the number of such combinations drastically increases as the number of wavelengths increases. For example, in a case of four-wavelength multiplexing transmission, the number of partially degenerate FWM light beams is 4×3=12, the number of non-degenerate FWM light beams is 4×3×2=24, and thus the number of FWM light beams is 36 in total. With the above-mentioned phase matching condition, the FWM light that actually grows strongly is limited to only a part thereof.

FIG. 2A to FIG. 2C are explanatory diagrams for illustrating related-art optical signal arrangements for mitigating the FWM light. FIG. 2A shows an example in which four waves of optical signals are arranged in a polarization interleaving arrangement. It is known that, when the optical signals are alternately arranged so that the polarization states of the optical signals adjacent on the frequency grids are orthogonal to each other, the influence of FWM can be reduced. In some implementations, this arrangement is referred to as "SPSP arrangement." In FIG. 2A, the polarization states are indicated by alternately arranging the upward and downward arrows as described above.

The effects of polarization interleaving can be given as follows. The optical signals having orthogonal polarizations do not cause the frequency beating, and hence a doubled frequency spacing of the optical signals can weaken the phase matching condition so that the FWM generation efficiency is decreased. Further, the polarizations can be used to reduce the number of wavelength combinations that cause the FWM light. The lower stage of FIG. 2A shows the frequency and the polarization state of the generated FWM light. The total number of FWM light beams is twelve, specifically, four partially degenerate FWM light beams and eight non-degenerate FWM light beams, and thus the total number is reduced to ⅓ of the above.

In contrast, FIG. 2B shows an example of an unequal spacing arrangement obtained by arranging the signal light beams on the optical frequency grids at spacings of 2Δf, Δf, and 4Δf in order of increasing frequency. The unequal spacing arrangement is a method of setting the frequency spacings so as to be different from each other in any two waves among all of the signals so that the generated FWM light is prevented from overlapping any optical signal. With this method, the quality degradation to be caused by the FWM light can be almost completely suppressed.

Further, as a wavelength/polarization arrangement for avoiding deterioration to be caused by the FWM light, polarization arrangements of FIG. 3A and FIG. 3B are described. FIG. 3A shows a four-wave arrangement example. It is assumed that the polarization states of the two waves on the outer sides are S-polarization, and the polarization states of the two waves on the inner sides are P-polarization, which is orthogonal to the S-polarization. The lower stage of FIG. 3A shows the optical frequency and the polarization state of the generated FWM light. In this arrangement, the number of generated FWM light beams is twelve. Among those FWM light beams, the FWM light beam overlapping the signal wavelength has a polarization state that is orthogonal to that of the signal light, and hence reception deterioration to be caused by the FWM light can be prevented. The intensity of FWM light is generally lower by −20 dB to −30 dB (1/100 to 1/1000) than that of signal light, but, when the polarization of the optical signal and the polarization of the FWM light match each other and thus the light interference condition may be satisfied, this influence becomes the square root of the intensity, which causes a large deterioration of from −10 dB to −15 dB (1/10 to 1/33). Meanwhile, when the polarization of the FWM light and the polarization of the signal are orthogonal to each other, both light beams do not cause light interference, and the influence on the waveform becomes extremely small, as low as from −20 dB to −30 dB. Thus, the deterioration to be caused by the FWM can be suppressed. Further, as a wavelength/polarization arrangement example in an eight-wavelength case, an "SPPSSPPS arrangement" in which, as illustrated in FIG. 3B, the arrangement (SPPS) in the four-wavelength case is successively arranged.

An object to be achieved by some implementations described herein is to provide a simple optical signal wavelength/polarization arrangement that is capable of solving problems of wavelength/polarization arrangement methods that have been used as FWM light countermeasures.

The FWM suppression effect obtained by the polarization interleaving method which is the related-art FWM suppression method is incomplete. As illustrated in FIG. 2A, on the same frequency grids as those of the optical signals sig1 to sig4, in some cases, non-degenerate FWM light beams having the same polarizations as those of the signal light beams are generated. Interference of those FWM light beams may cause a large transmission deterioration. The increase of the wavelength spacing by the polarization interleaving has an effect of statistically mitigating the influence of the FWM through polarization variation in the optical fiber, fluctuations of the zero-dispersion wavelength, and the like, but the possibility of becoming untransmissible remains in an optical fiber in which those variations are small.

Further, the unequal spacing arrangement can suppress the deterioration to be caused by the FWM light, but increase of the optical wavelength band and achievement of higher accuracy of the light source wavelength become large problems. It is known that the wavelength band to be required in the unequal spacing arrangement is about twice in the case of four wavelengths, and is about fivefold in the case of eight wavelengths. When the wavelength band is increased, optical loss of the optical signal is increased at both ends of the wavelength band. In addition, the optical wavelength is separated away from the zero-dispersion wavelength of the optical fiber so that a wavelength dispersion amount of the optical fiber transmission line is increased negatively or positively, or negatively and positively, and thus the transmission distance is reduced.

Further, FIG. 2C shows an influence of the wavelength accuracy in the unequal spacing arrangement. The generation frequency of the FWM light is determined based on the addition and subtraction of the three waves of pump light beams and idler light which are related to the generation, and hence the frequency error of the FWM light is expanded threefold in the worst case. FIG. 2C shows a position of light fwm212 generated at a wavelength f=f2−f1+f2 among partially degenerate FWM light beams generated by the optical signals sig1 and sig2. This FWM light is moved by −3δ (negative direction) when the optical signal sig2 has a frequency error of −δ (negative direction) and the optical signal sig1 has a frequency error of +δ (positive direction). Meanwhile, when the optical signal sig3 also has a frequency error of +δ in the positive direction, there is a possibility that the FWM light collides with the optical signal sig3. In order to avoid the collision, it is required to satisfy the relationship: (frequency error δ of each signal)< (¼ of grid spacing Δ). For example, in the case of CWM having a wavelength spacing Δ=20 nm described above, the tolerance of the frequency error is required to be reduced to +5 nm. In LAN-WDM having a narrow wavelength spacing, it is also required to consider the bandwidth of the signal wavelength (up to 100 GHz), and this influence becomes further conspicuous. It is required to narrow a temperature control range of the light source as the tolerance of the light source wavelength accuracy is decreased as described above, and thus there arises a problem in that electric power consumption, which is an important performance index of the optical transceiver, is greatly increased.

SUMMARY

Some implementations described herein provide a novel wavelength/polarization arrangement capable of suppressing FWM, which is unknown in the prior art.

In order to solve the above-mentioned problem, according to at least one implementation, there is provided a wavelength multiplexing optical transmission system including: a light source unit configured to generate a plurality of optical signals having different frequencies; and a wavelength multiplexing optical signal generating unit configured to receive the plurality of optical signals as input, and generate a wavelength multiplexing optical signal based on the plurality of input optical signals so as to output the wavelength multiplexing optical signal, wherein the plurality of optical signals are arranged on optical frequency grids having a frequency spacing of Δf, wherein the wavelength multiplexing optical signal includes at least one specific arrangement signal group, wherein the at least one specific arrangement signal group includes Q optical signal(s) having a first single-polarization state and R optical signal(s) having a second single-polarization state which is orthogonal to the first single-polarization state, where Q is an integer of 1 or more and R is an integer of 1 or more, wherein a frequency difference between any pair of optical signals having the first single-polarization state included in the at least one specific arrangement signal group is different from frequency differences between all of other pairs of optical signals having the first single-polarization state and frequency differences between all pairs of optical signals having the second single-polarization state, and wherein a frequency difference between any pair of optical signals having the second single-polarization state included in the at least one specific arrangement signal group is different from frequency differences between all pairs of optical signals having the first single-polarization state and frequency differences between all of other pairs of optical signals having the second single-polarization state.

In some implementations, at least one of the number of optical signals having the first single-polarization state, which are included in the at least one specific arrangement signal group, or the number of optical signals having the second single-polarization state, which are included in the at least one specific arrangement signal group, is three or more.

In some implementations, Q+R=4 may be satisfied. The Q optical signal(s) having the first single-polarization state and the R optical signal(s) having the second single-polarization state, which are included in the at least one specific arrangement signal group, may be arranged on the optical frequency grids in accordance with a pattern of one of SPSS or SSPS in order of increasing optical frequency, where S represents an optical signal having the first single-polarization state and P represents an optical signal having the second single-polarization state.

In some implementations, the plurality of optical signals are arranged in a target range on the optical frequency grids, and, in the target range, at least one guard grid on which an optical signal having the first single-polarization state and an optical signal having the second single-polarization state are prevented from being arranged is provided at a place other than a lowest frequency grid and a highest frequency grid in the target range.

In some implementations, for example, the Q optical signal(s) having the first single-polarization state and the R optical signal(s) having the second single-polarization state, which are included in the at least one specific arrangement signal group, may be arranged on the optical frequency grids in accordance with a pattern of any of PSGSP, SGSPP, or PPSGS in order of increasing optical frequency, where S represents the optical signal having the first single-polarization state, P represents the optical signal having the second single-polarization state, and G represents the at least one guard grid.

In some implementations, for example, the number of the plurality of optical signals may be five or more. The plurality of optical signals may be arranged on the optical frequency grids in accordance with a pattern obtained by cutting out one of a whole or a part of a successive pattern in which one pattern obtained by cyclically changing SPPSG in order of increasing optical frequency is successively repeated a plurality of times, where S represents the optical signal having the first single-polarization state, P represents the optical signal having the second single-polarization state, and G represents the at least one guard grid.

In some implementations, for example, the number of the plurality of optical signals may be eight or more. The plurality of optical signals may be arranged on the optical frequency grids in accordance with a pattern of SPPSGSPPS in order of increasing optical frequency.

In some implementations, for example, the number of the plurality of optical signals may be eight. The plurality of optical signals may be arranged on the optical frequency grids in accordance with a pattern of SPPSGSPPS in order of increasing optical frequency.

In some implementations, the wavelength multiplexing optical transmission system further includes an optical fiber transmission line configured to transmit the wavelength multiplexing optical signal, the plurality of optical signals are arranged in a target range of the optical frequency grids, and at least a part of the target range is included in an optical frequency range corresponding to a distribution range of a zero-dispersion wavelength of an optical fiber of the optical fiber transmission line.

In some implementations, for example, the entire target range may be included in the optical frequency range corresponding to the distribution range of the zero-dispersion wavelength of the optical fiber. The wavelength multiplexing optical signal may include a plurality of specific arrangement signal groups as the at least one specific arrangement signal group, each of the plurality of specific arrangement signal groups may satisfy the following condition: M−1≤K, where M represents the number of frequency grids from an optical signal having a lowest optical frequency, which is included in the each of the plurality of specific arrangement signal groups, to an optical signal having a highest optical frequency, which is included in the each of the plurality of specific arrangement signal groups, and K may satisfy the following expression: KΔf>B, where B represents a worst value of a phase matching bandwidth of the optical fiber transmission line.

In some implementations, for example, the at least one specific arrangement signal group may be arranged on frequency grids in a frequency range corresponding to the distribution range of the zero-dispersion wavelength of the optical fiber. The following expression may be satisfied: M−1≤K, where M represents the number of frequency grids from an optical signal having a lowest optical frequency, which is included in the at least one specific arrangement signal group, to an optical signal having a highest optical frequency, which is included in the at least one specific arrangement signal group, and K may satisfy the following expression: KΔf>B, where B represents a worst value of a phase matching bandwidth of the optical fiber transmission line.

In some implementations, the wavelength multiplexing optical transmission system may further include a wavelength multiplexing optical transmitter including the light source unit and the wavelength multiplexing optical signal generating unit. Each of the plurality of optical signals may be generated through one of binary modulation or multi-level modulation in which at least one of a light intensity, an optical electric field amplitude, or a phase of light from a light source is changed through use of an information signal.

In some implementations, for example, the wavelength multiplexing optical transmission system may further include a wavelength multiplexing optical receiver configured to receive the wavelength multiplexing optical signal transmitted from the wavelength multiplexing optical transmitter. The wavelength multiplexing optical receiver may be configured to demultiplex the received wavelength multiplexing optical signal into a plurality of single-wavelength optical signals, the wavelength multiplexing optical receiver may include a plurality of optical receivers, and each of the plurality of optical receivers may be configured to receive any of the plurality of single-wavelength optical signals.

In some implementations, there is provided a wavelength multiplexing optical transmitter including: a light source unit configured to generate a plurality of optical signals having different frequencies; and a wavelength multiplexing optical signal generating unit configured to receive the plurality of optical signals as input, and generate a wavelength multiplexing optical signal from the plurality of input optical signals so as to output the wavelength multiplexing optical signal, wherein the plurality of optical signals are arranged on optical frequency grids having a frequency spacing of Δf, wherein the wavelength multiplexing optical signal includes at least one specific arrangement signal group, wherein the at least one specific arrangement signal group includes Q optical signal(s) having a first single-polarization state and R optical signal(s) having a second single-polarization state which is orthogonal to the first single-polarization state, where Q is an integer of 1 or more and R is an integer of 1 or more, wherein a frequency difference between any pair of optical signals having the first single-polarization state included in the at least one specific arrangement signal group is different from frequency differences between all of other pairs of optical signals having the first single-polarization state and frequency differences between all pairs of optical signals having the second single-polarization state, and wherein a frequency difference between any pair of optical signals having the second single-polarization state included in the at least one specific arrangement signal group is different from frequency differences between all pairs of optical signals having the first single-polarization state and frequency differences between all of other pairs of optical signals having the second single-polarization state.

In some implementations, the wavelengths are arranged in accordance with an FWM suppression rule. The FWM suppression rule resides in "that optical signals in a partial optical signal group are formed of Q (Q is 1 or more) optical signal(s) having S-polarization and R (R is 1 or more, L=Q+R) optical signal(s) having P-polarization, which are orthogonal to each other, that frequency spacings between every two optical signals having the S-polarization are different from each other, that frequency spacings between every two optical signals having the P-polarization are different from each other, and that frequency spacings between every two optical signals in the S-polarization and frequency spacings between every two optical signals in the P-polarization are different from each other." In this manner, in the partial optical signal group having successive frequencies, the FWM light generated on the same optical frequency as that of the optical signal is limited to have a polarization state that is orthogonal to that of the signal light, and thus the influence of the FWM light can be greatly reduced. When any one of Q or R is 3 or more, at least one example implementation of the present invention is more valuable.

In some implementations, wavelengths and polarizations of optical signals are arranged so that a polarization state of FWM light overlapping a signal is orthogonal to that of the signal. In this manner, at least one example implementation of the present invention has an effect in that, even in the worst case in which there are no fluctuations in wavelength dispersion or polarization state in the optical fiber, deterioration can be suppressed even when the FWM light overlapping the signal is generated.

DETAILED DESCRIPTION

The following detailed description of example implementations refers to the accompanying drawings. The same reference numbers in different drawings may identify the same or similar elements.

In the following, some implementations assume a wavelength multiplexing optical transmission system in which, on optical frequency grids having equal frequency spacings of $\Delta f$, N waves (N is 4 or more) of single-polarization optical signals are each arranged in one polarization state of S-polarization or P-polarization orthogonal to the S-polarization so that information transmission is performed through use of an optical fiber as a transmission line.

Figure 1A:
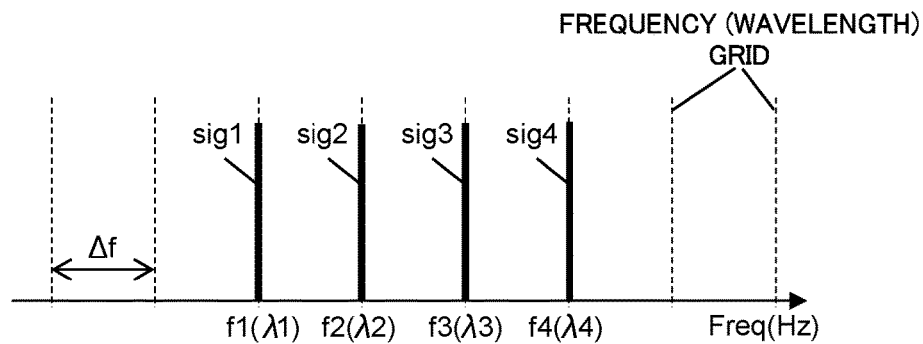
FIG. 1A is a diagram for illustrating an arrangement of WDM signals, which is an explanatory diagram for illustrating a principle of generation of FWM light.
Figure 1B:
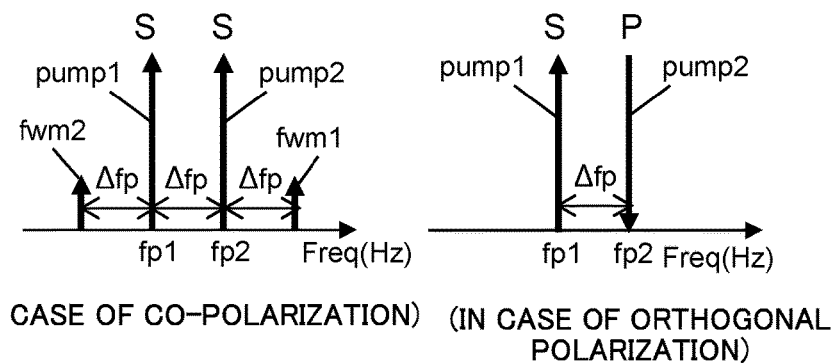
FIG. 1B is a diagram for illustrating generation principle of FWM light in a partially degenerate case.
Figure 1C:
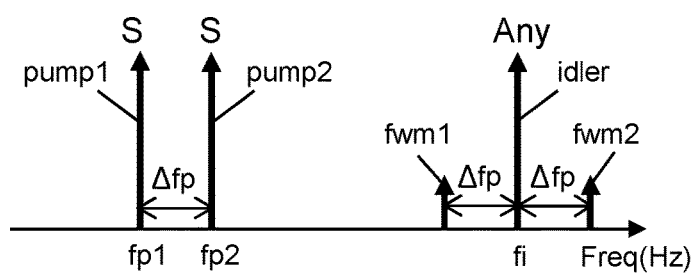
FIG. 1C is a diagram for illustrating generation principle of FWM light in a non-degenerate case.
Figure 1D:
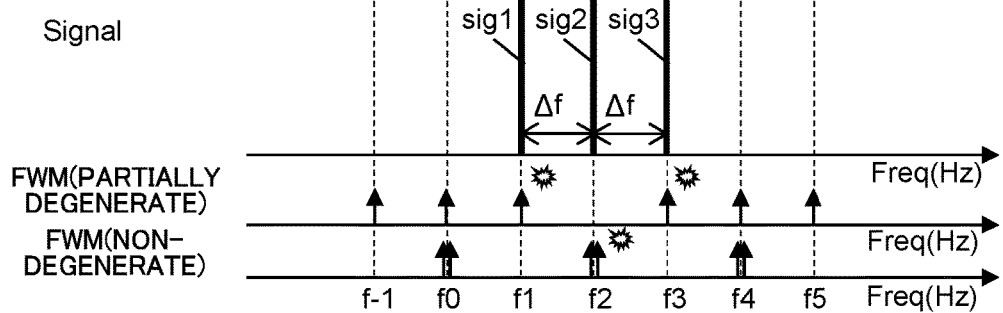
FIG. 1D is a diagram for illustrating generation example of FWM light in a three-wavelength case.
Figure 2A:
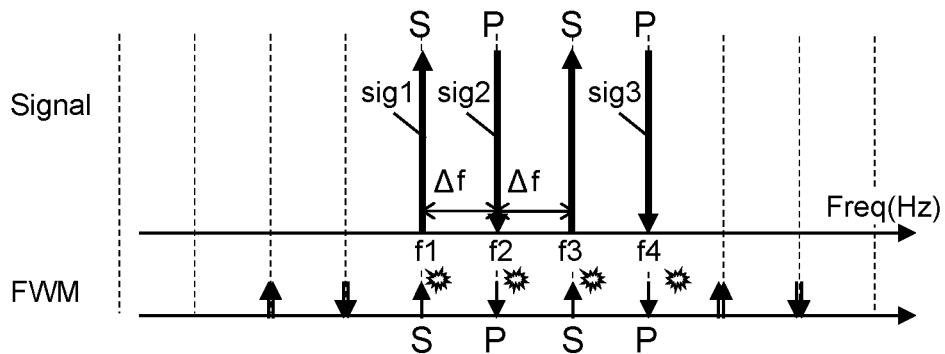
FIG. 2A is a diagram for illustrating polarization interleaving, which is a related-art optical signal arrangement for mitigating the FWM light.
Figure 2B:
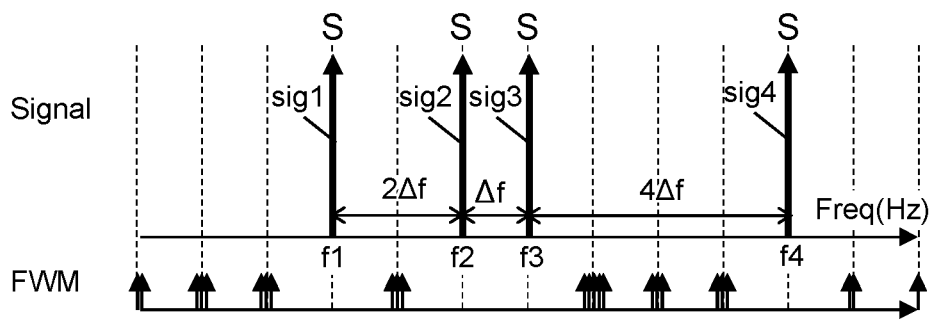
FIG. 2B is a diagram for illustrating unequal spacing arrangement, which is a related-art optical signal arrangement for mitigating the FWM light.
Figure 2C:
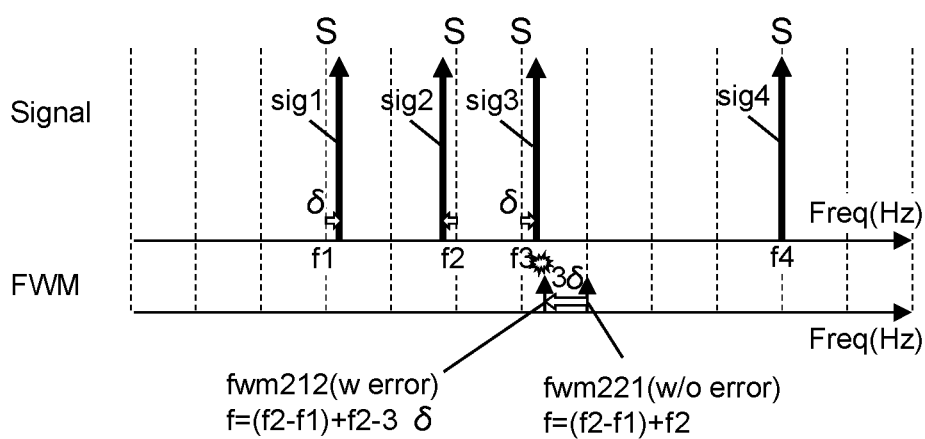
FIG. 2C is a diagram for illustrating unequal spacing arrangement with frequency error, which is a related-art optical signal arrangement for mitigating the FWM light.

In some implementations, an FWM suppression rule assumes, as a target, a partial optical signal group formed of, among the above-mentioned signals, L optical signals ($4 \leq L \leq N$) arranged on M (M is 4 or more) successive optical frequency grids. The FWM suppression rule resides in "that the optical signals in the partial optical signal group are formed of Q (Q is 1 or more) optical signal(s) having S-polarization and R (R is 1 or more, L–Q+R) optical signal(s) having P-polarization, that frequency spacings between every two optical signals having the S-polarization are different from each other, that frequency spacings between every two optical signals having the P-polarization are different from each other, and that frequency spacings between every two optical signals in the S-polarization and frequency spacings between every two optical signals in the P-polarization are different from each other." The generality and the validity of this rule can be described as follows:

(1) All of the FWM light beams to be generated by the interaction between S-polarized signals are S-polarized waves. When the number of S-polarized optical signals is one, no FWM is generated, but when the number is two, the partially degenerate state of the left diagram of FIG. 1B is established. Accordingly, the FWM light does not overlap the signal light itself so that the deterioration to be caused by the FWM becomes small. In a case of three waves or more, the S-polarized signals are arranged in an unequal spacing arrangement, that is, are arranged so that frequency spacings between every two waves are unequal spacings. Accordingly, even when any two waves cause a frequency beating $\Delta fp$ as pump light of FIG. 1C, the generation frequencies of the FWM light beams are at positions at which the frequencies are separated by $\Delta fp$ on higher and lower sides from the remaining other S-polarized signal (idler light). There are no S-polarized optical signals having the same frequency spacing $\Delta fp$, and hence the FWM deterioration can be suppressed. The same holds true also between P-polarized signals.

(2) As the FWM signal to be generated by the interaction between both of S-polarized and P-polarized optical signals, first, there is conceivable a case in which two waves of S-polarized signals (frequency spacing $\Delta fp$) become pump light, and any of the P-polarized signals becomes idler light. In this case, P-polarized FWM light beams are generated at frequencies separated by $\Delta fp$ on higher and lower sides of the idler light, but, in the above-mentioned rule, the P-polarized signals include no two waves having a frequency spacing equal to $\Delta fp$, and hence no FWM deterioration occurs. The same holds true also when the remaining two waves of P-polarized signals (frequency spacing S) become pump light and any of the S-polarized signals becomes idler light.

When this FWM suppression rule is satisfied as described above, it can be ensured that no FWM deterioration occurs inside of the partial optical signal group being the target. When the wavelength multiplexing optical signal includes one or more partial optical signal groups having a specific arrangement satisfying the FWM suppression rule, the influence of the FWM light on the wavelength multiplexing optical signal can be reduced. Such a partial optical signal group satisfying the FWM suppression rule is referred to as "specific arrangement signal group." In the present application, such a partial optical signal group satisfying the FWM suppression rule is also simply referred to as "partial optical signal group."

Figure 3A:
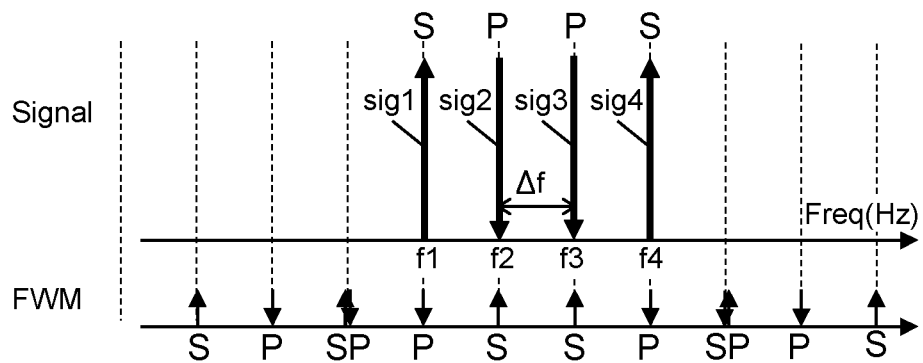
FIG. 3A is a diagram for illustrating arrangement of four waves, which is a related-art optical signal arrangement for mitigating the FWM light.
Figure 3B:
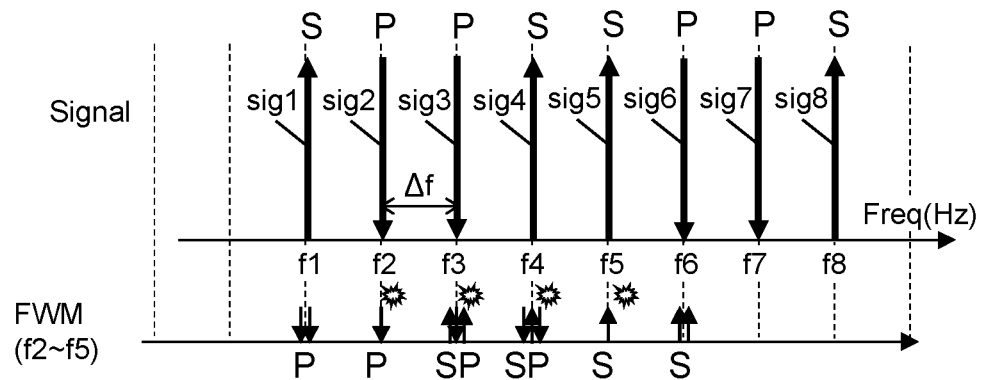
FIG. 3B is a diagram for illustrating arrangement of eight waves, which is a related-art optical signal arrangement for mitigating the FWM light.

In the wavelength/polarization arrangements of FIG. 3A and FIG. 3B, the four-wavelength arrangement of FIG. 3A can prevent the deterioration to be caused by the FWM, while the eight-wavelength arrangement of FIG. 3B cannot completely prevent the FWM deterioration. For example, in FIG. 3B, there are parts in which four waves of optical signals are arranged at equal spacings, such as SSPP in a part of the optical frequencies f2 to f5 and PPSS in a part of the optical frequencies f4 to 17. With the same principle as that in the case of polarization interleaving as described above, an FWM signal having the same polarization overlaps the signal so that signal deterioration is caused. The lower stage of FIG. 3B shows FWM light beams to be generated by the four waves of optical signals sig2 to sig5 arranged on the optical frequency grids f2 to f5. It is understood that all of the signals sig2 to sig5 have FWM light beams generated in the same polarizations and on the same optical frequency grids, and thus there is a possibility of causing large deterioration.

For such a case in which four waves of signals are successively arranged at equal spacings, there has been known one type of wavelength/polarization arrangement that can suppress deterioration to be caused by the FWM. However, a more general polarization/wavelength arrangement rule for suppressing the FWM and a method of increasing the number of signals to five waves or more while suppressing the FWM deterioration remain unclear.

Figure 4:
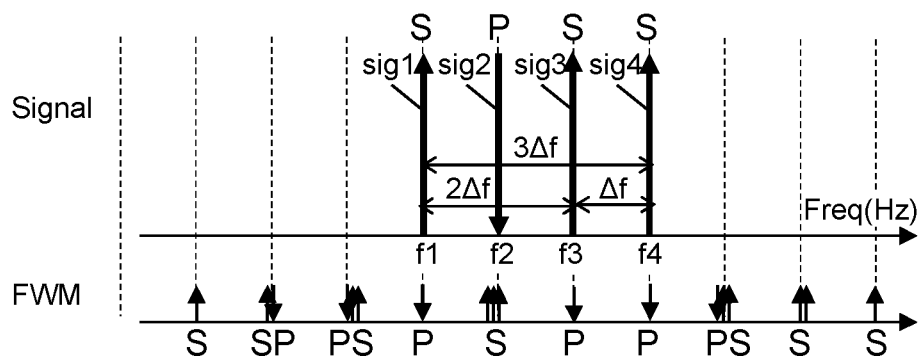
FIG. 4 is a diagram for illustrating a wavelength/polarization arrangement in a first example implementation of the present invention.

In view of the above, FIG. 4 is a diagram for illustrating a wavelength/polarization arrangement in a first example implementation of the present invention, and shows a wavelength/polarization arrangement satisfying the FWM suppression rule of the present invention when four waves of optical signals sig1 to sig4 are arranged on four successive optical frequency grids f1 to f4, respectively. This arrangement corresponds to an SPSS arrangement in which, among the four waves, two outer-side waves and one inner-side wave (in this example, sig1, sig3, and sig4) have the same polarization state S, and the remaining one inner-side wave (sig2) has the orthogonal polarization state P. Even when this arrangement is expressed as an SSPS, PPSP, or PSPP arrangement, those arrangements are equivalent because of the symmetric property of the polarization state and the frequency axis. In this arrangement, the three S-polarized waves may be arranged at spacings unequal to each other. As the frequency spacing between any two waves in the S-polarization group, there may be three ways of Δf, 2Δf, and 3Δf, which all take different values. Further, there may be only one wave having the P-polarization, and hence the FWM suppression rule of the present invention may be satisfied. The three waves of S-polarized optical signals may be arranged at unequal spacings, and hence the generated FWM light (S-polarization) may not overlap other S-polarized optical signals. Even when the generated FWM light (S-polarization) overlaps the P-polarized optical signal sig2, the polarizations may be orthogonal to each other, and hence the deterioration may be suppressed. Meanwhile, when the frequency beating to be caused by any two wavelengths having the S-polarization modulates the P-polarized optical signal sig2 as the idler light, P-polarized FWM light may be generated. However, even when this P-polarized FWM light overlaps the S-polarized optical signals sig1, sig3, and sig4, the polarizations may be orthogonal to each other, and hence the signal deterioration may be suppressed. The wavelength/frequency arrangement of this example is a novel arrangement that is unknown in the related art.

The SPSS arrangement in which four waves of signals are arranged on successive wavelength grids may have an effect in that, in addition to the FWM suppression effect, the number of optical components to be required for polarization conversion can be saved and reduced as compared to the case of the SPPS arrangement.

In consideration of the equivalence of the two orthogonal polarizations of S and P and the bilateral symmetry of the frequencies, as combinations of assigning the polarization states S and P to optical signals on four successive optical frequency grids, there are six ways of SSSS, SSSP, SSPS, SSPP, SPSP, and SPPS in total. Among those arrangements, when a publicly-known SPPS arrangement and the SSPS arrangement of the present invention are excluded, the remaining arrangements are four types. Among the arrangements, in SSSS and SSSP, four wavelengths or three wavelengths in the S-polarization have spacings equal to each other (grid spacing Δf), and, in SSPP and SPSP, the frequency spacing between the two S-polarized waves and the frequency spacing between the two P-polarized waves are the same. Accordingly, those arrangements do not satisfy the FWM suppression rule of the present invention, and are polarization arrangements that cannot prevent the FWM deterioration.

Figure 5A:
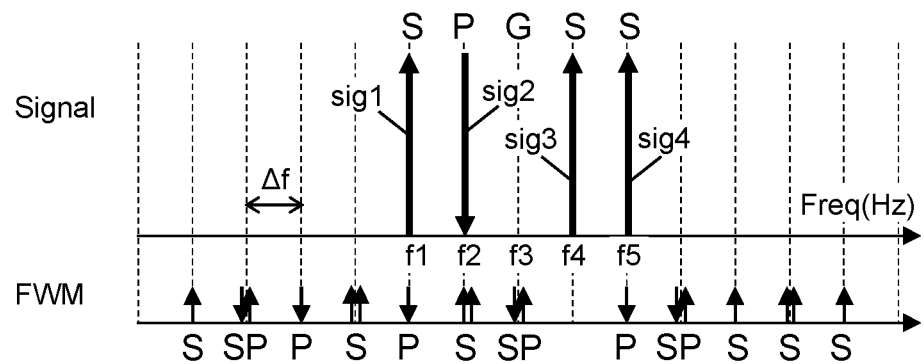
FIG. 5A is a diagram for illustrating an SPGSS arrangement, which is a wavelength/polarization arrangement in a second example implementation of the present invention.
Figure 5B:
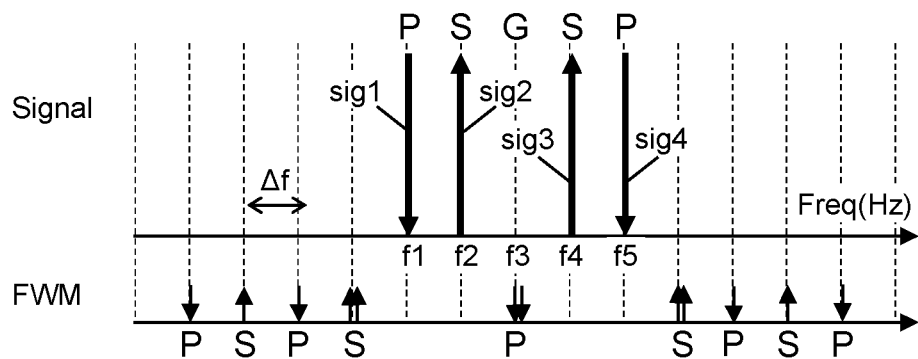
FIG. 5B is a diagram for illustrating a PSGSP arrangement, which is a wavelength/polarization arrangement in a second example implementation of the present invention.

FIG. 5A and FIG. 5B are diagrams for illustrating wavelength/polarization arrangements in a second example implementation of the present invention, and show two examples in which four waves of optical signals are arranged on five successive optical frequency grids. Both of FIG. 5A and FIG. 5B set a center grid as a vacant grid (hereinafter referred to as a "guard grid" and expressed as "G"). The guard grid may be a grid on which no optical signal is arranged, which may be provided at a place other than those of the lowest frequency grid and the highest frequency grid in a target range in which a plurality of optical signals are to be arranged. That is, when the partial optical signal group includes the guard grid, a frequency difference between signals in the successive frequency grids may be 2Δf or more. When the optical signals are arranged on five or more frequency grids, provision of the guard grid provides an effect of being capable of suppressing the FWM. FIG. 5A shows an SPGSS arrangement, which is an arrangement satisfying the FWM suppression rule of some implementations described herein because, even when the guard grid is provided, the frequency spacings between two waves in the S-group are Δf, 3Δf, and 4Δf, which are all different. As illustrated in the lower stage of FIG. 5A, all of the FWM light beams generated on the same frequencies as those of the signal light beams have polarizations orthogonal to those of the signal light beams. As described above, the FWM suppression rule of some implementations described herein is also effective when the guard grid on which no optical signal is arranged is provided, and the FWM suppression effect may be further enhanced by decreasing the FWM generation efficiency by providing the guard grid so as to widen the wavelength spacing.

Further, FIG. 5B shows a PSGSP arrangement that may satisfy the FWM suppression rule of the present invention because the frequency spacing between two waves in the S-polarization group is 2Δf, the frequency spacing between two waves in the P-polarization group is 4Δf, and both of the frequency spacings are different from each other. This arrangement has an advantage in that, with the effect of the center guard grid, the FWM suppression effect is greatly enhanced as compared to the case of the publicly-known SPPS arrangement. In this example, the smallest frequency spacing is expanded from Δf to 2Δf so as to be doubled. In addition, as illustrated in FIG. 5B, this arrangement can prevent the FWM light from being generated on the optical frequency of the signal light. When those optical signals are subjected to wavelength demultiplexing and directly received, leakage of FWM light does not be generated at all in the received signal in both of co-polarization and orthogonal polarization, and hence the degradation of the signal light quality can be further reduced. Further, in this arrangement, none of the optical signals have co-polarization FWM light on adjacent frequency grids, and hence there is an effect in that the tolerance against the frequency error of the light source is also enhanced so as to be doubled or more as compared to the case of the related-art unequal spacing arrangement.

Figure 6:
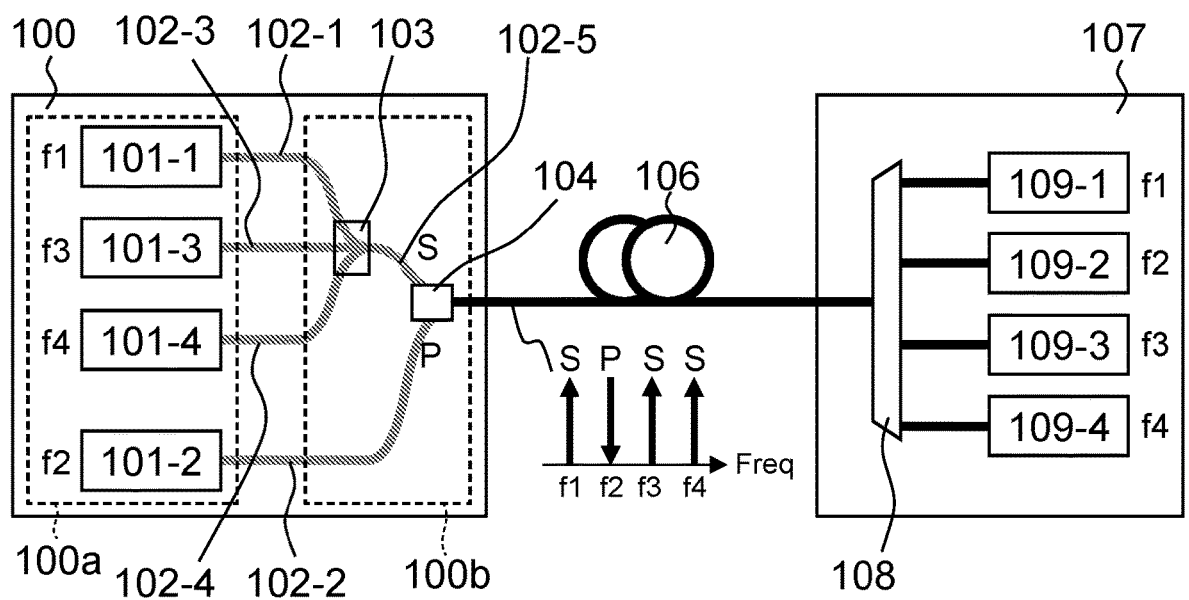
FIG. 6 is a first configuration diagram of a wavelength multiplexing optical transmission system in the first example implementation of the present invention.

FIG. 6 is a first configuration diagram of a wavelength multiplexing optical transmission system in the first example implementation of the present invention, and shows an example for achieving the SPSS arrangement of FIG. 4. The wavelength multiplexing optical transmission system may include a wavelength multiplexing optical transmitter 100, an optical fiber transmission line 106, and a wavelength multiplexing optical receiver 107. The wavelength multiplexing optical transmitter 100 may include a light source unit 100a for generating a plurality of optical signals having different frequencies, and a wavelength multiplexing optical signal generating unit 100b for generating a wavelength multiplexing optical signal from the plurality of input optical signals so as to output the generated wavelength multiplexing optical signal. Meanwhile, the wavelength multiplexing optical receiver 107 may include a wavelength demultiplexer 108 for demultiplexing the received wavelength multiplexing light into a plurality of single-wavelength optical signals, and receivers 109-1 to 109-4 for receiving the demultiplexed single-wavelength optical signals. In some implementations, in the wavelength multiplexing optical transmitter 100, light beams from the light source may be subjected to binary modulation or multi-level modulation through use of information signals so that optical signals each having single polarization are generated. The information signal changes at least one of a light intensity, an optical electric field amplitude, or a phase. Meanwhile, the optical receiver may be only required to receive those optical signals through direct reception or coherent reception in which the above-mentioned single-polarization components are selectively extracted. In this manner, information transmission using single-polarization optical signals may be allowed while the influence of the orthogonal-polarization FWM light is suppressed. FIG. 6 shows, as an example, the wavelength multiplexing optical transmission system in which the wavelength multiplexing optical signal output from the wavelength multiplexing optical transmitter 100 is transmitted through the optical fiber transmission line 106 and is then received by the wavelength multiplexing optical receiver 107. In FIG. 6, four intensity modulation light sources 101 having different optical frequencies form the light source unit 100a, and mainly a polarization maintaining wavelength multiplexer 103 and a polarization combining coupler 104 form the wavelength multiplexing optical signal generating unit 100b. Inside of the wavelength multiplexing optical transmitter 100, intensity modulation light sources 101-1 (optical frequency f1), 101-3 (optical frequency f3), 101-4 (optical frequency f4), and 101-2 (optical frequency f2) which have different oscillation wavelengths (optical frequencies) may be arranged, and each of the intensity modulation light sources 101-1 to 101-4 outputs binary or multi-level intensity modulated light having single linear polarization, which has been modulated through use of an independent information signal. The output light beams of the intensity modulation light sources 101-1, 101-3, and 101-4 may be transmitted via polarization maintaining optical fibers 102-1, 102-3, and 102-4, respectively, so as to be multiplexed by the polarization maintaining wavelength multiplexer 103 while maintaining their polarization states, and may then be input to an S-input port of the polarization combining coupler 104 via a polarization maintaining optical fiber 102-5 so as to be output to the optical fiber transmission line 106 as light having a polarization state S. Meanwhile, the output light of the intensity modulation light source 101-2 may be similarly input to a polarization maintaining optical fiber 102-2 so as to be input to a P-input port of the polarization combining coupler 104 while maintaining its polarization state, and may then be output to the optical fiber transmission line 106 as light having a polarization state P which is orthogonal to the above-mentioned polarization state S. With this configuration, it is possible to generate a wavelength multiplexing optical signal having the SPSS arrangement of FIG. 4 in which, among the four optical frequencies of the frequency grids f1, f2, f3, and f4, three waves having the optical frequencies f1, f3, and f4 have the S-polarization and one wave having the optical frequency f2 has the P-polarization.

Inside of the wavelength multiplexing optical receiver 107, the wavelength demultiplexer 108 may be arranged. The wavelength demultiplexer 108 demultiplexes the received wavelength multiplexing light into a plurality of single-wavelength optical signals. After that, the single-wavelength optical signals may be directly received by the respective optical receivers 109-1, 109-2, 109-3, and 109-4 employing the direct reception method. The single-wavelength optical signals may be received through coherent reception. The optical fiber transmission line 106 has, although slight, random polarization mode dispersion (PMD), and hence the orthogonality of optical signals having separate wavelengths in the optical fiber may be lost a little by little along with the transmission in the optical fiber. However, FWM is strongly caused at an input portion of about 5 km to 20 km of the optical fiber at which the optical signal is strong, and hence, as long as the wavelength bandwidth to be used for wavelength multiplexing transmission ranges from 10 nm to several tens of nanometers, the orthogonality between proximate wavelengths is generally kept even in the fiber transmission line, and the FWM suppression effect of some implementations described herein can be maintained.

As the reception of the FWM signal in some implementations, there is adopted direct reception in which the single-polarization optical signal may be directly changed to an electric signal through use of a photodiode or the like, and the effect of the present invention is exerted at this time. Accordingly, the present invention is applicable not only to reception of a general binary or multi-level intensity modulated signal but also to reception of modulated signals in a wider range. There are wide variety of examples thereof such as analog light intensity (amplitude) modulation, optical (differential) phase modulation, optical frequency modulation, optical subcarrier modulation, OFDM modulation, and combinations of intensity/phase modulations. In any of those types of modulation, optical direct detection (including delay detection) and the like may be employed. Further, in the case of single-polarization transmission not using polarization multiplexing, the some implementations are applicable even when an optical electric field coherent reception method is used. The reason therefor is because, when the wavelength/polarization arrangement of the present invention is applied, the FWM light generated on the same frequency as that of the received light is only an orthogonal polarization component which is not used for information transmission, and thus no degradation of the signal quality is caused.

Figure 7:
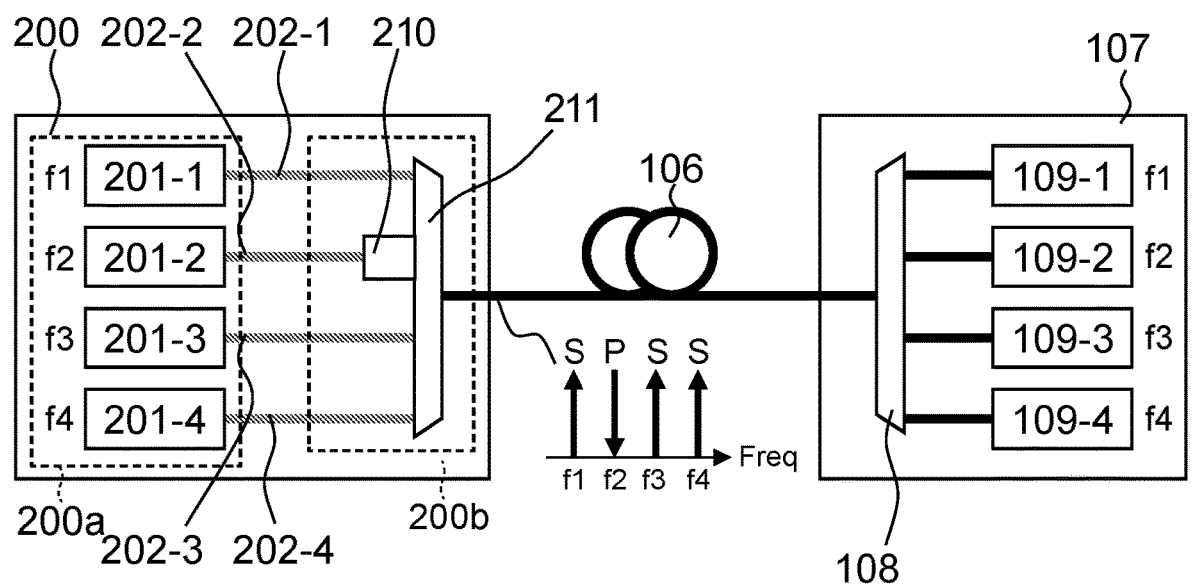
FIG. 7 is a second configuration diagram of the wavelength multiplexing optical transmission system in the first example implementation of the present invention.

FIG. 7 is a second configuration diagram of the optical transmission system in the first example implementation of the present invention. In this example, the optical signal having the wavelength/polarization arrangement of the present invention may be generated through wavelength/polarization combining that is different from that of FIG. 6 described above. In this example, four intensity modulation optical transmission light sources 201 having different optical frequencies form a light source unit 200a, and mainly a half wave plate 210 and a polarization maintaining wavelength multiplexer 211 form a wavelength multiplexing optical signal generating unit 200b. In this example, output light beams of intensity modulation optical transmission light sources 201-1, 201-2, 201-3, and 201-4 may be input to the polarization maintaining wavelength multiplexer 211 via respective polarization maintaining optical fibers 202-1, 202-2, 202-3, and 202-4 so that four-wavelength multiplexing may be performed. At this time, the half wave plate 210 may be arranged while being inclined by 45° only in the path of the optical signal having the frequency f2. In this manner, this signal may be converted to have orthogonal polarization, and thus an optical signal having a wavelength/polarization arrangement of SPSS arrangement of the present invention may be generated. Accordingly, as compared to the publicly-known wavelength arrangement such as SPPS, the number of required half wave plates can be reduced.

FIG. 6 and FIG. 7 show typical methods for achieving the wavelength multiplexing optical transmission system and the wavelength multiplexing optical transmitter, but configurations thereof are not limited to the shown ones, and various achievement methods can be employed. For example, instead of using the wavelength coupler, an optical coupler having no wavelength dependence may be used, or the optical signal to be subjected to polarization rotation may be exchanged. Further, the optical components may be achieved by means of a bulk optical system or may be integrally mounted as waveguide components.

Figure 8:
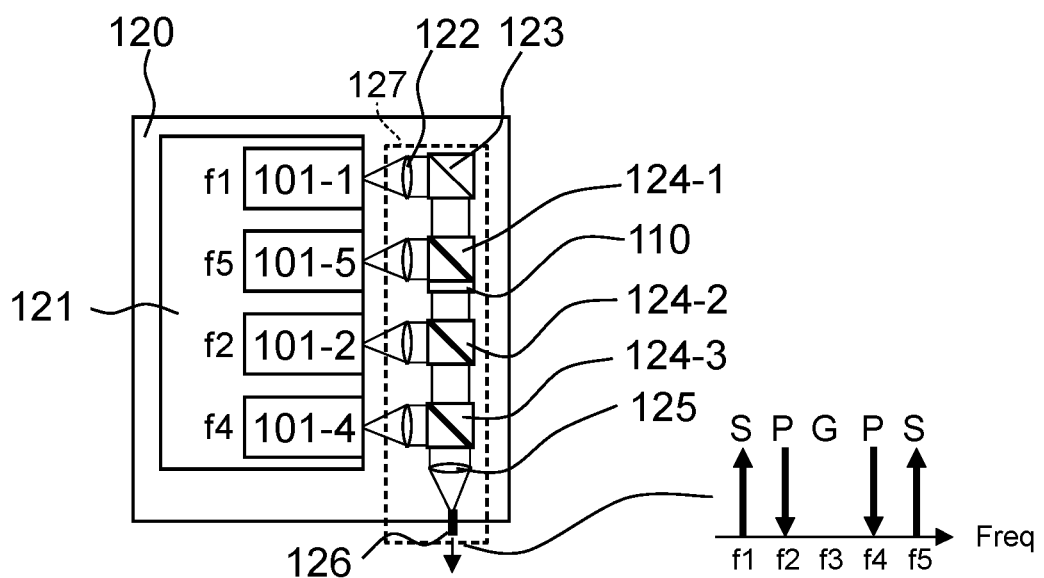
FIG. 8 is a configuration diagram of a wavelength multiplexing transmission module in the second example implementation of the present invention.

FIG. 8 is a configuration diagram of a wavelength multiplexing transmission module (TOSA) 120 in a second example implementation of the present invention. In this example, a four-wavelength multiplexing integrated light source 121 for outputting four wavelengths having different optical frequencies forms a light source unit, and mainly collimating lenses 122, reflecting mirrors 123, a half wave plate 110, a condensing lens 125, and an output port 126 from a wavelength multiplexing optical signal generating unit 127. Inside of the wavelength multiplexing transmission module 120, four intensity modulation optical transmission light sources 101-1 (optical frequency f1), 101-5 (optical frequency f5), 101-2 (optical frequency f2), and 101-4 (optical frequency f4) which may have different optical frequencies may be mounted. From each of those light sources, binary or multi-level modulated light subjected to intensity modulation through use of an information signal may be diffused into space light. The collimating lens 122 condenses this diffused light into parallel light, and the direction of the parallel light may be changed by the reflecting mirror 123. Wavelength multiplexers 124-1, 124-2, and 124-3 perform wavelength combining of parallel light with output light of other light sources, and the condensing lens 125 couples and outputs the light to the output port 126. In the middle of the path of the parallel light, the half wave plate 110 may be arranged while being inclined by 45°. When the optical signals having the optical frequencies f1 and f5 pass through the half wave plate 110, the polarization states thereof may be orthogonally converted. As a result, this example can obtain a wavelength/polarization arrangement in which the polarization state of the outer-side optical signals having the optical frequencies f1 and f5 may be orthogonal to that of the inner-side optical signals having the optical frequencies f2 and f4. In this example, the optical frequency f3 corresponds to an unused guard grid, and the wavelength/polarization arrangement of the output light is an SPGPS arrangement which is equivalent to the PSGSP arrangement of FIG. 5B.

in some implementations, provision of any number of vacant grids, that is, guard grids on the frequency grids can increase the effect of the present invention and enhance the degree of freedom of the optical wavelength/polarization arrangement. When all of the optical signals are arranged adjacent to each other without using the guard grid, four waves (M=L=4: four waves are arranged on four successive frequency grids) are the upper limit to satisfy the FWM suppression rule, and an arrangement of five or more waves is impossible. However, when the guard grid is provided as appropriate, five or more waves of optical signals can be arranged in an FWM suppression arrangement using the orthogonal polarization, which has been unknown so far.

Figure 9:
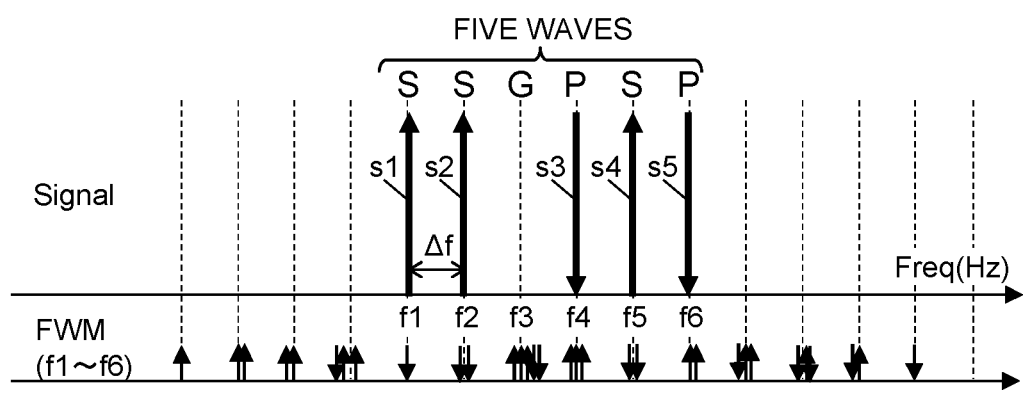
FIG. 9 is a diagram for illustrating a wavelength/polarization arrangement in a third example implementation of the present invention.

FIG. 9 is a diagram for illustrating a wavelength/polarization arrangement in a third example implementation of the present invention, and shows an example in which, on six successive frequency grids (M=6: f1 to f6), five waves (L=5) of signals s1 to s5 are arranged in an arrangement of SSGPSP. This arrangement may be a wavelength/polarization arrangement satisfying the FWM suppression rule of the present invention because (1) as the frequency spacings between any two waves in the S-group, there are three ways of $\Delta f$, $3\Delta f$, and $4\Delta f$, which are all different from each other, (2) as the frequency spacing of two waves in the P-group, there is one way of $2\Delta f$, and (3) the frequency spacings in the S-group and the P-group are all different from each other. The lower stage of FIG. 9 shows the polarization states and the optical frequencies of all of the FWM light beams which may be generated by the interaction of the five waves of signals s1 to s5. All of the FWM light beams generated on the same frequencies as those of the signals s1 to s5 may have polarizations orthogonal to those of the signals. As described above, in the present invention, through use of the guard grid, a signal arrangement capable of suppressing the deterioration to be caused by the FWM may be achieved even when the number L of optical signals exceeds five. Further, a transmission capacity may be increased, and a transmission distance may be extended through reduction of a frequency band and reduction of wavelength dispersion.

However, when the number of wavelengths is further increased, the number of generated FWM light beams may be drastically increased, and hence a very large number of guard grids may be required in order to strictly satisfy the FWM suppression rule of the present invention in all wavelengths. The increase of the number of guard grids may cause troubles such as reduction of a usage efficiency of the wavelength band to cause shortage of the transmission capacity, and great expansion of a wavelength bandwidth to cause loss of optical signals and an increase of wavelength dispersion, leading to a drastic decrease of the transmission distance.

To address those issues, with respect to the partial optical signal group formed of L optical signals arranged on M successive optical frequency grids which are a subset of the wavelength band, some implementations include an optical signal arrangement that locally ensures FWM suppression of the present invention. When the FWM suppression rule is locally applied in consideration of the phase matching bandwidth, there are effects in that the required wavelength band is reduced so that the transmission band is increased and the band usage efficiency is enhanced, and in that the influence of the wavelength dispersion is reduced so that the transmission distance is extended. The reason therefor is because, in an actual optical fiber, as the wavelength spacing between the signal light beams related to FWM generation is increased, the generation efficiency of the FWM is greatly reduced. As described above, the phase matching bandwidth of FWM is not constant because the phase matching bandwidth greatly varies depending on the tension state or the like during manufacture of the optical fiber. For example, the phase matching bandwidth of the optical fiber may vary such that the phase matching bandwidth is 2 nm or less at minimum, while the phase matching bandwidth is 16 nm at maximum in the worst optical fiber in which the FWM is liable to occur. When the width of the frequency grid spacing is represented by $\Delta f$, the bandwidth of the partial optical signal group arranged on the M successive frequency grids is $(M-1)\Delta f$. Accordingly, as a guide for local FWM suppression of the partial optical signal group, it is only required to satisfy $B < M\Delta f$, where B is the worst value of the phase matching bandwidth of the transmission line. The generation efficiency of the FWM is sharply reduced when the wavelength spacing of the optical signals exceeds the phase matching bandwidth of the optical fiber. Accordingly, with respect to the minimum integer K satisfying the relationship:

(the worst value of the phase matching bandwidth of the optical fiber transmission line)<KΔf, when the FWM suppression rule is satisfied in all partial optical signal groups of M≤K in the range of all of the optical signals, the suppression of the FWM can be ensured in the entire wavelength band. For example, the optical frequency spacing Δf of the LAN-WDM standard in the 1.3 um band is 800 GHz (wavelength spacing is about 4.5 nm), and in the case of M=5, (M−1)Δf=18 nm is satisfied. This value is larger than the worst phase matching bandwidth B=16 nm described above, and hence it is understood that the FWM suppressing effect can be obtained by the present invention.

When the wavelength band to be used in optical transmission is wider than a distribution range of the zero-dispersion wavelength of the optical fiber, it may be only required to use a wavelength/polarization arrangement satisfying the FWM suppression rule of the present invention only in the partial optical signal group within the distribution range of the zero-dispersion wavelength of the optical fiber.

Figure 10A:
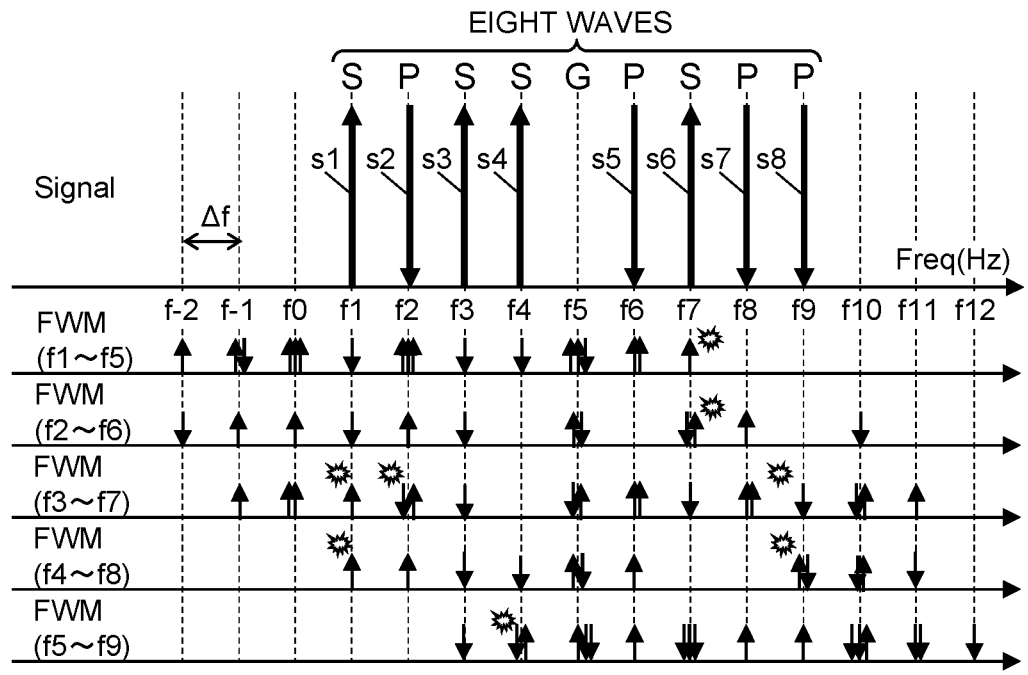
FIG. 10A is a diagram for illustrating an SPSSGPSPP arrangement, which is a wavelength/polarization arrangement in a fourth example implementation of the present invention.
Figure 10B:
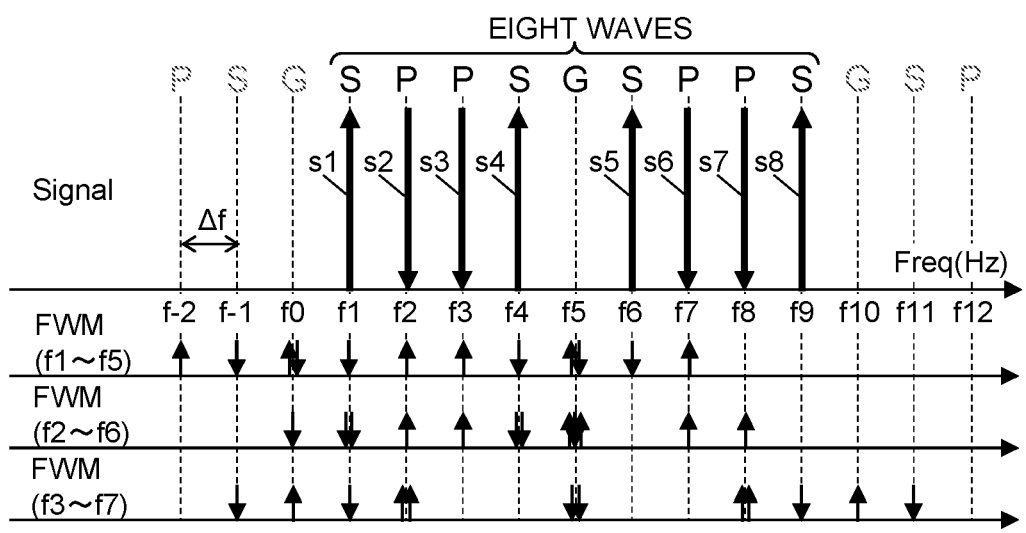
FIG. 10B is a diagram for illustrating an SPPSGSPPS arrangement, which is a wavelength/polarization arrangement in a fourth example implementation of the present invention.

FIG. 10A and FIG. 10B are diagrams for illustrating wavelength/polarization arrangements in a fourth example implementation of the present invention. Eight waves (L=8) of optical signals are arranged on nine successive frequency grids (M=9). Both of the two examples of FIG. 10A and FIG. 10B cannot satisfy the FWM suppression rule of the present invention in the eight waves as a whole, but correspond to examples of an arrangement which locally satisfies the FWM suppression rule of the present invention in each of partial optical signal groups on all of successive frequency grids of up to M=5 at maximum.

FIG. 10A shows an example in which the eight waves are arranged as SPSSGPSPP. In the eight waves as a whole, for example, the S-group and the P-group include signal arrangements SS and PP which both have the frequency spacing Δf, and hence the FWM suppression rule of the present invention is not satisfied. However, when the wavelength/polarization arrangement on the five successive grids is extracted in order of increasing frequency, there are five optical signal groups of SPSSG (frequencies f1 to f5), PSSGP (frequencies f2 to f6), SSGPS (frequencies f3 to f7), SGPSP (frequencies f4 to f8), and GPSPP (frequencies f5 to f9). All of those groups satisfy the FWM suppression rule of the present invention. The lower stage of FIG. 10A shows the FWM signals generated in those five optical signal groups, and it can be confirmed that all of the FWM light beams overlapping the optical signals in each group are orthogonal to the signal light beams.

In this arrangement, the FWM suppression rule is not satisfied with respect to six successive frequency grids (M=6). This can be determined as follows. As the wavelength/polarization arrangements of the optical signal groups in the case of M=6, there are four ways of SPSSGP, PSSGPS, SSGPSP, and SGPSPP in order of increasing frequency. Among those optical signal groups, the second optical signal group PSSGPS includes two waves having the frequency spacing 4Δf in both of the S-group and the P-group, and the fourth optical signal group SGPSPP includes two waves having the frequency spacing 3Δf in both of the S-group and the P-group. As described above, this FWM suppression rule is valuable also for determination on the vulnerability to the FWM of the wavelength/polarization arrangement of the optical signals.

Further, this arrangement can ensure the FWM suppression in the partial optical signal group, but this is not the case for the FWM light generated outside of the partial optical signal group. For example, in FIG. 10A, with reference to the FWM light beams FWM (f1 to f5) generated from the optical signal group SPSSG on five successive frequency grids f1 to f5, it is understood that, on a frequency grid f7, an optical signal f having the same polarization state as that of the signal light s6 outside of the optical signal group is generated.

Meanwhile, FIG. 10B shows an example in which eight waves are arranged as SPPSGSPPS. This example is also an example of the wavelength/polarization arrangement satisfying the FWM suppression rule of the present invention in the partial optical signal groups of M=5. The partial optical signal groups of M=5 in this example are, in order from increasing frequency, SPPSG (frequencies f1 to f5), PPSGS (frequencies f2 to f6), PSGSP (frequencies f3 to f7), SGSPP (frequencies f4 to f8), and GSPPS (frequencies f5 to f9). In consideration of the frequency symmetry of this arrangement, the last two groups are equivalent to the front two groups. The remaining front three groups, specifically, the optical signal groups SPPSG, PPSGS, and PSGSP all include two waves of S-polarized signals and two waves of P-polarized signals, and the spacing between the two S-polarized waves and the spacing between the two P-polarized waves are different from each other. Accordingly, it can be easily confirmed that the FWM suppression rule of the present invention is satisfied. The five partial optical signal groups included in this arrangement are all arranged in a cyclic pattern of five letters of SPPSG. The cyclic pattern here refers to any of orders obtained by cyclically changing SPPSG in order of increasing optical frequency of the optical frequency grid. Specifically, the cyclic pattern can be may be obtained by moving one letter in the front to the back in order, and corresponds to patterns of SPPSG, PPSGS, PSGSP, SGSPP, and GSPPS. The patterns of SPPSG and GSPPS have G on the outermost side, and hence those patterns have substantially the same arrangement as that of the partial optical signal group of L=M=4. The patterns of PPSGS, PSGSP, and SGSPP are partial optical signal groups having a special arrangement of L=4 and M=5.

In the lower part of FIG. 10B, the frequency/polarization states of the FWM light beams to be generated by the above-mentioned three partial optical signal groups f1 to f5, f2 to f6, and f3 to f7 are indicated by arrows. This arrangement is an arrangement having a special advantage for FWM suppression because of the following two features.

The first feature resides in that, in this arrangement, any FWM light beam generated by the partial optical signal group of M=5 may have a polarization state orthogonal to that of even an optical signal on the outer side of the partial optical signal group. That is, the FWM light beams to be caused by the partial optical signal group (in SPPSG arrangement) on the frequency grids f1 to f5 generate not only on the frequencies f1 to f4 of the signal light beams s1 to s4 belonging to this optical signal group, but also on the frequency f7 of the signal light s6. This FWM light may have a polarization orthogonal to that of the signal light s6. Similarly, the FWM light beams to be generated by the optical signal group of s2 to s5 on the optical frequency grids f2 to f6 generate on, in addition to those signals, the signal light s1 having the optical frequency f1 and the signal light beams s6 and s7 having the optical frequencies f7 to f8, but those FWM light beams may be all similarly orthogonal to the signal light beams. The same holds true also with respect to the optical signal group of f3 to 17. In this manner, it can be confirmed that, in this arrangement, all of the FWM light beams to be generated by the partial optical signal groups of up to M=5 may be orthogonal to other optical signals even outside of the bands of the optical signal groups, and it is understood that, in this arrangement, the effect of suppressing the deterioration to be caused by the FWM light is particularly high.

The second feature of this arrangement resides in that, when the arrangement pattern of SPPSG is further repeatedly arranged on the front and the rear, the number of wavelengths may be unlimitedly extended. The number of wavelengths is extended as a pattern obtained by cutting out the whole or a part of a successive pattern in which one pattern obtained by cyclically changing the polarization states of the optical signals of SPPSG (or PSSPG) in order of increasing optical frequency is successively repeated a plurality of times. In this manner, even when the number of wavelengths is five or more, the FWM suppression rule may be satisfied in all of the partial optical signal groups on five successive grids (M=5) at maximum. The successive pattern in which the one pattern may be successively repeated a plurality of times refers to the following. For example, in a case of the one pattern obtained by cyclically changing SPPSG, the successive pattern in which the pattern of SPPSG may be successively repeated three times may be SPPSGSPPSGSPPSG. In this case, the pattern obtained by cutting out the whole of the successive pattern may be a pattern of SPPSGSPPSGSPPSG. The pattern obtained by cutting out a part of the successive pattern corresponds to, for example, SPPSGSP and PSGSPPSG, which may be obtained through cut-out including the head and the end, SGSPPSGS, which may be obtained through cut-out of a center portion of the pattern at any position, and the like. The patterns obtained by cutting out the whole or the part may be merely examples, and may be other patterns. As a specific example of such an extension, in FIG. 10B, P, S, G may be arranged on optical frequencies f−2, f−1, and f0, respectively, on the left side of the eight wavelengths arranged in FIG. 10B, and G, S, and P may be arranged on optical frequencies f10, f11, and f12, respectively, on the right side thereof. Even when such an extension is performed, it may be confirmed that the FWM light beams to be generated by the three partial optical signal groups of FIG. 10B may be orthogonal to the signal light beams having the optical frequencies f−2, f−1, f0, f10, f11, and f12 in the extension portion (P-polarization indicated by the downward arrow in the case of the optical frequency on which the S-polarized signal light may be arranged, and S-polarization indicated by the upward arrow in the case of the optical frequency on which the P-polarized optical signal is arranged). FIG. 10B shows a case in which the optical signals are eight waves, but even when the optical signals are eight waves or more, when a part in which the optical signals are arranged in accordance with the pattern of SPPSGSPPS is present, a particularly high effect of suppressing the FWM light can be obtained.

Description has been given above based on the SPPSGSPPS arrangement, but this arrangement may have a cyclic property in units of five letters of SPPSG, and hence the head may be started from any position. Eight-wave arrangements such as PPSGSPPSGS, PSGSPPSGSP, and SGSPPSGSPP (S and P can be inverted) also may have the same property as that described above. However, from a viewpoint of band usage efficiency, SPPSGSPPS having one guard grid may be the most advantageous arrangement because the required band can be minimized.

Such a wavelength/polarization arrangement may have a wide statistical distribution of the zero-dispersion wavelength of the optical fiber, and may be particularly effective for a case considered to have generation of FWM over the entire signal wavelength band. Further, when the distribution of the zero-dispersion wavelength is narrower than the wavelength band to be used in wavelength optical multiplexing transmission, the present invention is not required to be applied to all of the wavelengths, and the FWM suppression rule of the present invention is only required to be applied to each partial optical signal group only within the distribution region of the zero-dispersion wavelength. As such an example, the wavelength/polarization arrangements of FIG. 10A and FIG. 10B may be applied only to the nine frequency grids on which the zero-dispersion wavelength appears, and in other wavelength bands, the guard grid may be removed and a dense wavelength arrangement without control of the signal light polarization state may be applied.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A wavelength multiplexing optical transmission system, comprising:
a light source unit configured to generate a plurality of optical signals having different frequencies; and
a wavelength multiplexing optical signal generating unit configured to receive the plurality of optical signals as input, and generate a wavelength multiplexing optical signal based on the plurality of input optical signals so as to output the wavelength multiplexing optical signal,
wherein the plurality of optical signals are arranged on optical frequency grids having a frequency spacing of $\Delta f$,
wherein the wavelength multiplexing optical signal includes at least one specific arrangement signal group,
wherein the at least one specific arrangement signal group includes Q optical signal(s) having a first single-polarization state and R optical signal(s) having a second single-polarization state which is orthogonal to the first single-polarization state, where Q is an integer of two or more and R is an integer of two or more,
wherein a frequency difference between any pair of optical signals having the first single-polarization state included in the at least one specific arrangement signal group is different from frequency differences between all of other pairs of optical signals having the first single-polarization state and frequency differences between all pairs of optical signals having the second single-polarization state, and
wherein a frequency difference between any pair of optical signals having the second single-polarization state included in the at least one specific arrangement signal group is different from frequency differences between all pairs of optical signals having the first single-polarization state and frequency differences between all of other pairs of optical signals having the second single-polarization state.

2. The wavelength multiplexing optical transmission system according to claim 1, wherein at least one of a number of optical signals having the first single-polarization state, which are included in the at least one specific arrangement signal group, or the number of optical signals having the second single-polarization state, which are included in the at least one specific arrangement signal group, is three or more.

3. The wavelength multiplexing optical transmission system according to claim 2,
wherein Q+R=4 is satisfied, and
wherein the Q optical signal(s) having the first single-polarization state and the R optical signal(s) having the second single-polarization state, which are included in the at least one specific arrangement signal group, are arranged on the optical frequency grids in accordance with a pattern of one of SPSS or SSPS in order of increasing optical frequency, where S represents an optical signal having the first single-polarization state and P represents an optical signal having the second single-polarization state.

4. The wavelength multiplexing optical transmission system according to claim 1,
wherein the plurality of optical signals are arranged on the optical frequency grids, and
wherein at least one guard grid, on which an optical signal having the first single-polarization state and an optical signal having the second single-polarization state are prevented from being arranged, is provided at a place other than a lowest frequency grid and a highest frequency grid.

5. The wavelength multiplexing optical transmission system according to claim 4, wherein the Q optical signal(s) having the first single-polarization state and the R optical signal(s) having the second single-polarization state, which are included in the at least one specific arrangement signal group, are arranged on the optical frequency grids in accordance with a pattern of any of PSGSP, SGSPP, or PPSGS in order of increasing optical frequency, where S represents the optical signal having the first single-polarization state, P represents the optical signal having the second single-polarization state, and G represents the at least one guard grid.

6. The wavelength multiplexing optical transmission system according to claim 4,
wherein the plurality of optical signals are arranged on the optical frequency grids in accordance with a pattern obtained by cutting out one of a whole or a part of a successive pattern in which one pattern obtained by cyclically changing SPPSG in order of increasing optical frequency is successively repeated a plurality of times, where S represents the optical signal having the first single-polarization state, P represents the optical signal having the second single-polarization state, and G represents the at least one guard grid.

7. The wavelength multiplexing optical transmission system according to claim 6,
wherein the plurality of optical signals are arranged on the optical frequency grids in accordance with a pattern of SPPSGSPPS in order of increasing optical frequency.

8. The wavelength multiplexing optical transmission system according to claim 7,
wherein the plurality of optical signals are arranged on the optical frequency grids in accordance with a pattern of SPPSGSPPS in order of increasing optical frequency.

9. The wavelength multiplexing optical transmission system according to claim 1, further comprising an optical fiber transmission line configured to transmit the wavelength multiplexing optical signal.

10. The wavelength multiplexing optical transmission system according to claim 1, further comprising a wavelength multiplexing optical transmitter including the light source unit and the wavelength multiplexing optical signal generating unit,
wherein each of the plurality of optical signals is generated through one of binary modulation or multi-level modulation in which at least one of a light intensity, an optical electric field amplitude, or a phase of light from a light source is changed through use of an information signal.

11. The wavelength multiplexing optical transmission system according to claim 10, further comprising a wavelength multiplexing optical receiver configured to receive the wavelength multiplexing optical signal transmitted from the wavelength multiplexing optical transmitter,
wherein the wavelength multiplexing optical receiver is configured to demultiplex the received wavelength multiplexing optical signal into a plurality of single-wavelength optical signals, wherein the wavelength multiplexing optical receiver includes a plurality of optical receivers, and wherein each of the plurality of optical receivers is configured to receive any of the plurality of single-wavelength optical signals.

12. A wavelength multiplexing optical transmitter, comprising:

a light source unit configured to generate a plurality of optical signals having different frequencies; and a wavelength multiplexing optical signal generating unit configured to receive the plurality of optical signals as input, and generate a wavelength multiplexing optical signal from the plurality of input optical signals so as to output the wavelength multiplexing optical signal, wherein the plurality of optical signals are arranged on optical frequency grids having a frequency spacing of $\Delta f$, wherein the wavelength multiplexing optical signal includes at least one specific arrangement signal group, wherein the at least one specific arrangement signal group includes Q optical signal(s) having a first single-polarization state and R optical signal(s) having a second single-polarization state which is orthogonal to the first single-polarization state, where Q is an integer of two or more and R is an integer of two or more, wherein a frequency difference between any pair of optical signals having the first single-polarization state included in the at least one specific arrangement signal group is different from frequency differences between all of other pairs of optical signals having the first single-polarization state and frequency differences between all pairs of optical signals having the second single-polarization state, and wherein a frequency difference between any pair of optical signals having the second single-polarization state included in the at least one specific arrangement signal group is different from frequency differences between all pairs of optical signals having the first single-polarization state and frequency differences between all of other pairs of optical signals having the second single-polarization state.

13. The wavelength multiplexing optical transmitter of claim 12, wherein at least one of a number of optical signals having the first single-polarization state, which are included in the at least one specific arrangement signal group, or the number of optical signals having the second single-polarization state, which are included in the at least one specific arrangement signal group, is three or more.

14. The wavelength multiplexing optical transmitter of claim 12, wherein the plurality of optical signals are arranged on the optical frequency grids, and wherein at least one guard grid, on which an optical signal having the first single-polarization state and an optical signal having the second single-polarization state are prevented from being arranged, is provided at a place other than a lowest frequency grid and a highest frequency grid.

15. The wavelength multiplexing optical transmitter of claim 12, further comprising an optical fiber transmission line configured to transmit the wavelength multiplexing optical signal.

16. The wavelength multiplexing optical transmitter of claim 12, further comprising a wavelength multiplexing optical transmitter including the light source unit and the wavelength multiplexing optical signal generating unit.

17. The wavelength multiplexing optical transmitter of claim 16, further comprising a wavelength multiplexing optical receiver configured to receive the wavelength multiplexing optical signal transmitted from the wavelength multiplexing optical transmitter.

18. A system, comprising:

a light source unit configured to generate a plurality of optical signals having different frequencies; and a wavelength multiplexing optical signal generating unit configured to receive the plurality of optical signals as input, and generate a wavelength multiplexing optical signal from the plurality of input optical signals so as to output the wavelength multiplexing optical signal, wherein the plurality of optical signals are arranged on optical frequency grids having a frequency spacing of $\Delta f$, wherein the wavelength multiplexing optical signal includes at least one specific arrangement signal group, wherein the at least one specific arrangement signal group includes Q optical signal(s) having a first single-polarization state and R optical signal(s) having a second single-polarization state which is orthogonal to the first single-polarization state, where Q is an integer of two or more and R is an integer of two or more, wherein a frequency difference between any pair of optical signals having the first single-polarization state included in the at least one specific arrangement signal group is different from frequency differences between all of other pairs of optical signals having the first single-polarization state and frequency differences between all pairs of optical signals having the second single-polarization state, and wherein a frequency difference between any pair of optical signals having the second single-polarization state included in the at least one specific arrangement signal group is different from frequency differences between all pairs of optical signals having the first single-polarization state and frequency differences between all of other pairs of optical signals having the second single-polarization state.

\* \* \* \* \*